(12) United States Patent
Corbin et al.

(10) Patent No.: US 10,244,769 B2
(45) Date of Patent: Apr. 2, 2019

(54) METHOD OF CUTTING A PORK LOIN AND A BONELESS PORK LOIN PRODUCT

(71) Applicant: Tyson Foods, Inc., Springdale, AR (US)

(72) Inventors: Collin Hunter Corbin, Bethal Heights, AR (US); Robert Ty Baublits, Springdale, AR (US); Richard Strickland, Farmington, AR (US); Edward J. Yancey, II, Huntsville, AR (US)

(73) Assignee: Tyson Foods, Inc., Springdale, AR (US)

( * ) Notice: Subject to any disclaimer, the term of this patent is extended or adjusted under 35 U.S.C. 154(b) by 315 days.

(21) Appl. No.: 14/820,943

(22) Filed: Aug. 7, 2015

(65) Prior Publication Data

US 2016/0037788 A1 Feb. 11, 2016

Related U.S. Application Data

(60) Provisional application No. 62/034,300, filed on Aug. 7, 2014.

(51) Int. Cl.
*B26D 3/24* (2006.01)
*A22C 17/00* (2006.01)
*A23L 13/00* (2016.01)
*A23L 13/70* (2016.01)

(52) U.S. Cl.
CPC .......... *A22C 17/0033* (2013.01); *A23L 13/00* (2016.08); *A23L 13/70* (2016.08)

(58) Field of Classification Search
CPC ...... A22C 17/0033; A23L 13/70; A23L 13/00
USPC ............................................... 426/645; 83/39
See application file for complete search history.

(56) References Cited

U.S. PATENT DOCUMENTS

| | | |
|---|---|---|
| 3,594,189 A | 7/1971 | Panattoni |
| 3,946,461 A | 3/1976 | Martin |
| 4,019,223 A | 4/1977 | Baker |
| 4,067,085 A | 1/1978 | Gasbarro |
| 4,083,083 A | 4/1978 | Duncan et al. |
| 4,229,859 A | 10/1980 | Gagliardi, Jr. et al. |
| 4,306,335 A | 12/1981 | Hawk et al. |
| 4,328,569 A | 5/1982 | Trott et al. |
| 4,424,608 A | 1/1984 | Martin |
| 4,503,587 A | 3/1985 | Martin |
| 4,536,919 A | 8/1985 | Cashwell et al. |
| 4,589,165 A | 5/1986 | Lerner et al. |
| 4,660,148 A | 6/1987 | Scheier |
| 4,715,092 A | 12/1987 | Lerner et al. |
| 4,745,658 A | 5/1988 | Lerner |
| RE32,697 E | 6/1988 | Hazenbroek et al. |
| 4,930,187 A | 6/1990 | Whittington |
| 4,993,115 A | 2/1991 | Hazenbroek |
| 5,021,024 A | 6/1991 | Villemin et al. |
| 5,088,957 A | 2/1992 | Gagliardi, Jr. |
| 5,368,520 A | 11/1994 | Koch et al. |
| 5,370,573 A | 12/1994 | Warren et al. |
| 5,378,104 A | 1/1995 | Hjorth |
| 5,464,368 A | 11/1995 | White et al. |
| 5,466,186 A | 11/1995 | Hjorth |
| 5,482,502 A | 1/1996 | Hjorth |
| 5,525,103 A | 6/1996 | White et al. |
| 5,591,076 A | 1/1997 | Evers et al. |
| 5,746,649 A | 5/1998 | Skaar et al. |
| 5,779,532 A | 7/1998 | Gagliardi, Jr. |
| 5,951,392 A | 9/1999 | Gagliardi |
| 5,976,608 A | 11/1999 | Gagliardi, Jr. |
| 6,155,919 A | 12/2000 | Haagensen et al. |
| 6,238,281 B1 | 5/2001 | Gagliardi, Jr. |
| 6,248,013 B1 | 6/2001 | Thomas et al. |
| 6,280,311 B1 | 8/2001 | Kuck |
| 6,319,110 B1 | 11/2001 | Peters et al. |
| 6,572,467 B1 | 6/2003 | Hirokane |
| 6,688,961 B2 | 2/2004 | Smith |
| 6,769,977 B2 | 8/2004 | Kuck |
| 6,921,326 B2 | 7/2005 | Smith |
| 6,929,541 B2 | 8/2005 | Cevantes et al. |
| 7,004,830 B2 | 2/2006 | van der Steen et al. |

(Continued)

FOREIGN PATENT DOCUMENTS

SU 626747 A * 10/1978

OTHER PUBLICATIONS https://paleoleap.com/pork-and-apple-skewers/https://web.archive.org/web/20140214070014/https://paleoleap.com/pork-and-apple-skewers/Pork and Apple Skewers Recipe Feb. 14, 2014.*

(Continued)

*Primary Examiner* — Vera Stulii

(74) *Attorney, Agent, or Firm* — McAfee & Taft, A Professional Corporation

(57) ABSTRACT

A meat product and method of cutting a boneless elongated meat member are disclosed. The elongated meat member is the loin of a hog carcass; the elongated meat member has a first end, a second end, and a longitudinal axis between the first and second ends. The method includes separating the elongated meat member into at least three elongated meat portions, two exterior elongated meat portions, and an interior elongated meat portion between the two exterior portions, the interior elongated meat portion is substantially in the shape of a rectangular prism. The separating step includes cutting the elongated meat member end to end in substantially the same direction of the longitudinal axis the length of the elongated meat member. The method also includes dividing the boneless elongated meat member into a plurality of smaller meat pieces by cutting the boneless elongated meat member substantially perpendicular to the longitudinal axis.

19 Claims, 13 Drawing Sheets

(56) References Cited

U.S. PATENT DOCUMENTS

| | | |
|---|---|---|
| 7,022,007 B2 | 4/2006 | Naehring et al. |
| 7,022,077 B2 | 4/2006 | Mourad et al. |
| 7,134,958 B2 | 11/2006 | Gagliardi, Jr. |
| 7,175,517 B1 | 2/2007 | Weakley |
| 7,473,166 B2 | 1/2009 | Sbarro |
| 7,479,296 B2 | 1/2009 | Gagliardi, Jr. |
| 7,857,687 B2 | 12/2010 | Gagliardi, Jr. |
| 7,867,069 B2 | 1/2011 | Gagliardi, Jr. |
| 8,187,061 B2 | 5/2012 | Lobel |
| 8,348,730 B2 | 1/2013 | Lobel |
| 8,727,840 B2 | 5/2014 | Connor et al. |
| 2005/0123664 A1 | 6/2005 | Gagliardi, Jr. |

OTHER PUBLICATIONS

University of Nebraska Lincoln, Pork.org Porcine Myology, http://porcine.unl.edu/porcine2005/pages/index.jsp?what=crossectionD&sectionName=oo, last accessed Apr. 30, 2012.

University of Nebraska Lincoln, Pork.org Porcine Myology, http://porcine.unl.edu/porcine2005/pages/index.jsp?what=crossectionD&sectionName=pp, last accessed Apr. 30, 2012.

University of Nebraska Lincoln, Pork.org Porcine Myology, http://porcine.unl.edu/porcine2005/pages/index.jsp?what=crossectionD&sectionName=p, last accessed Apr 30, 2012.

* cited by examiner

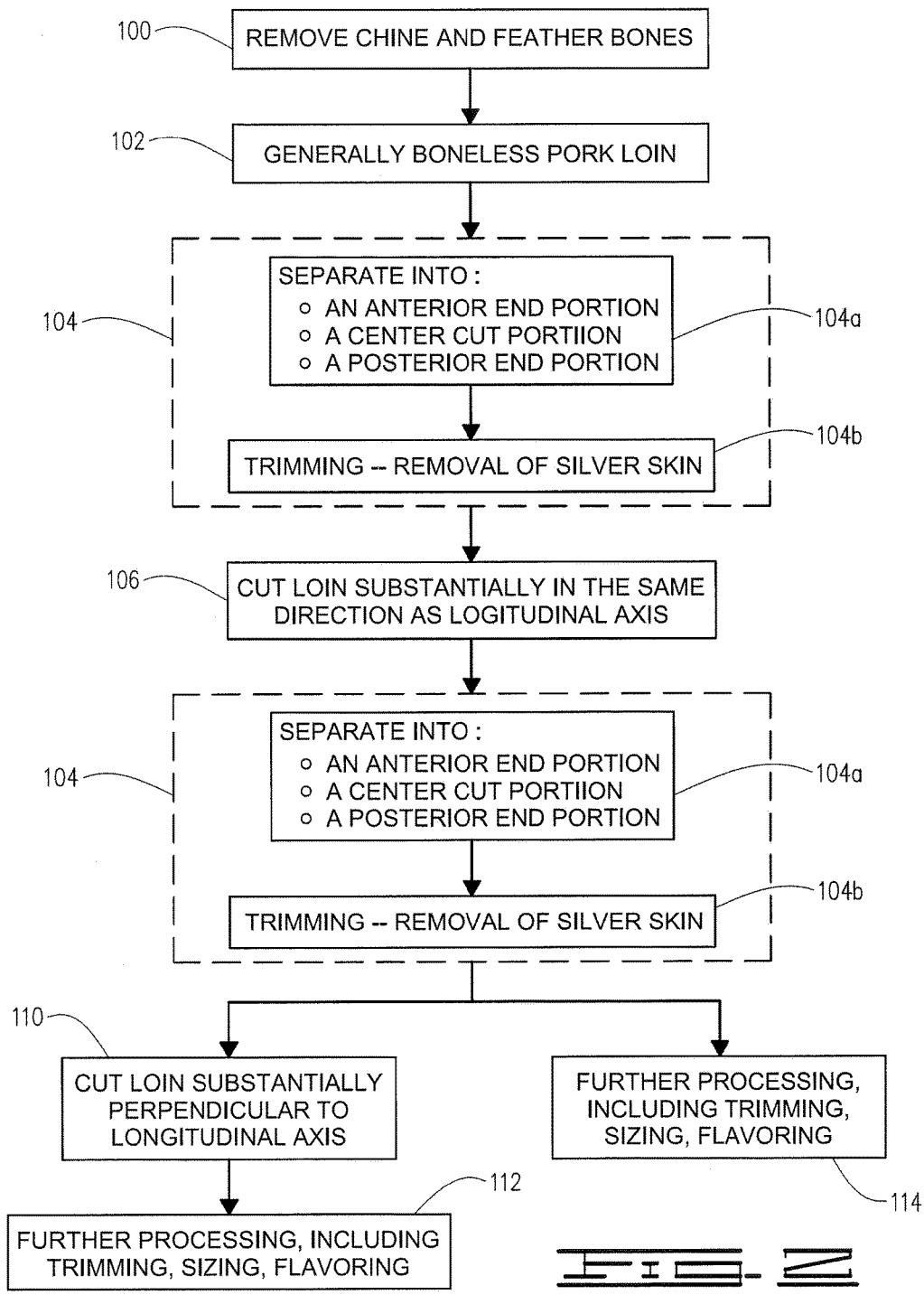

TO FIG. 3B

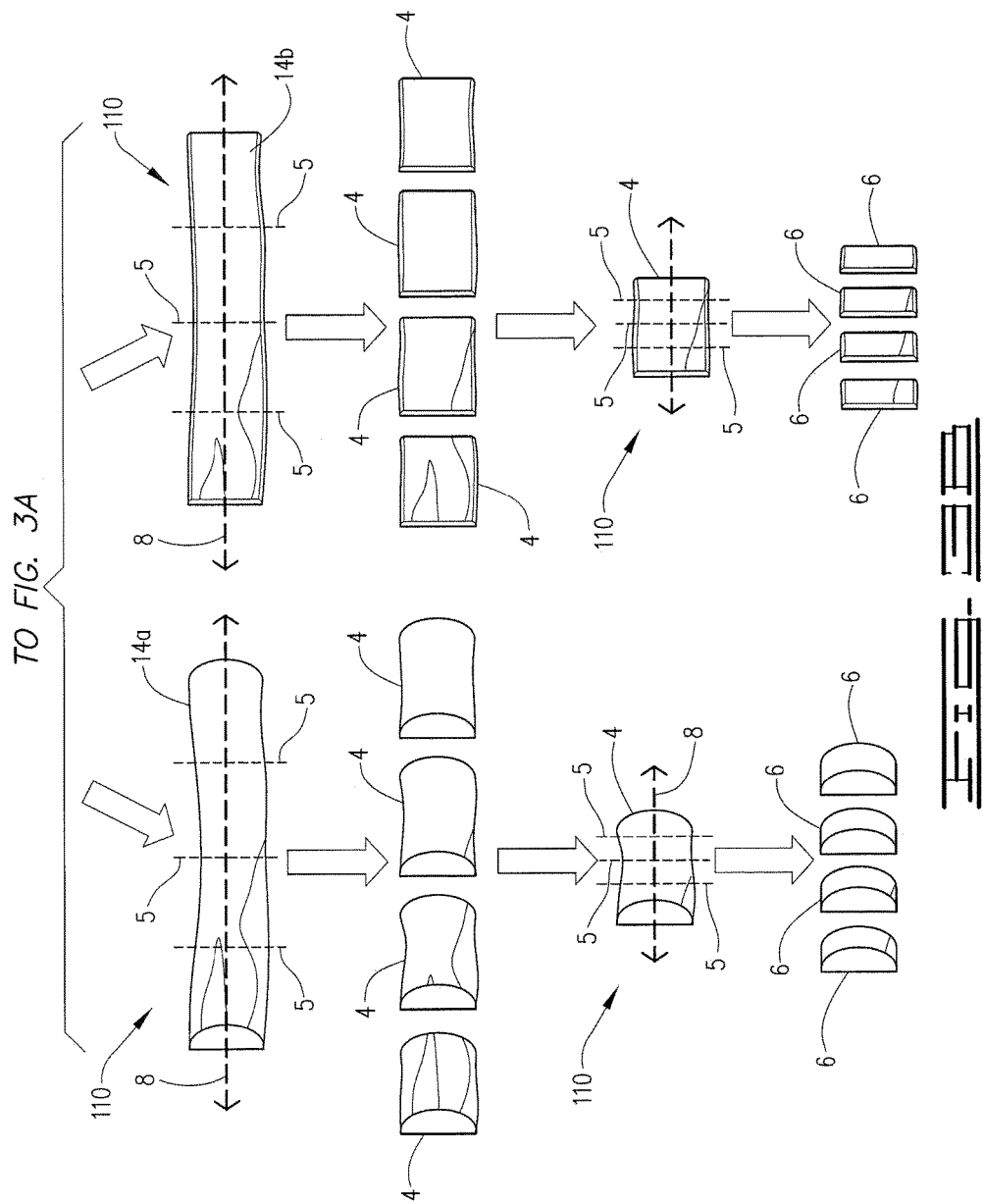

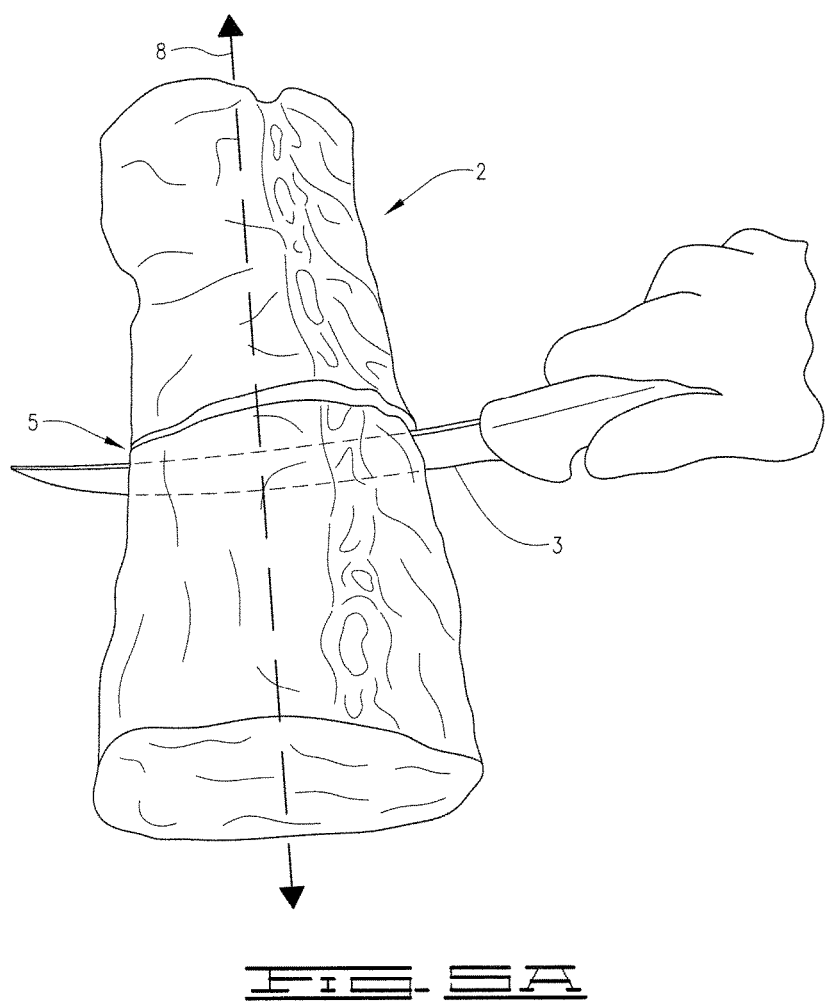

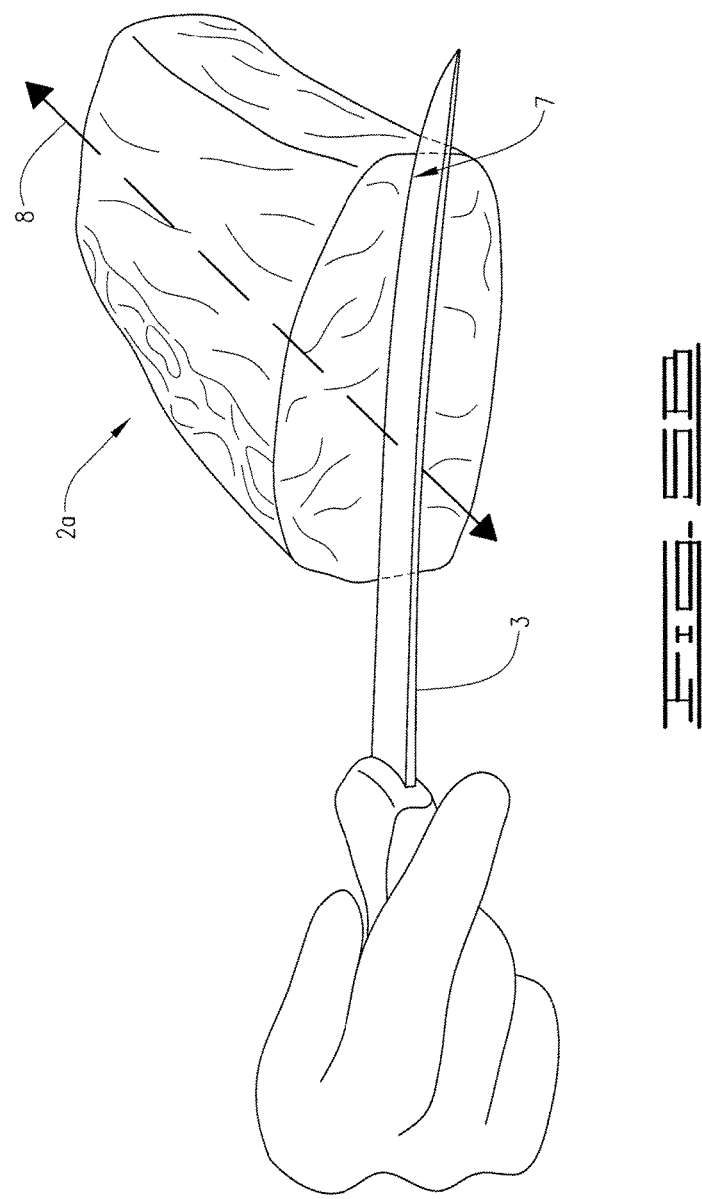

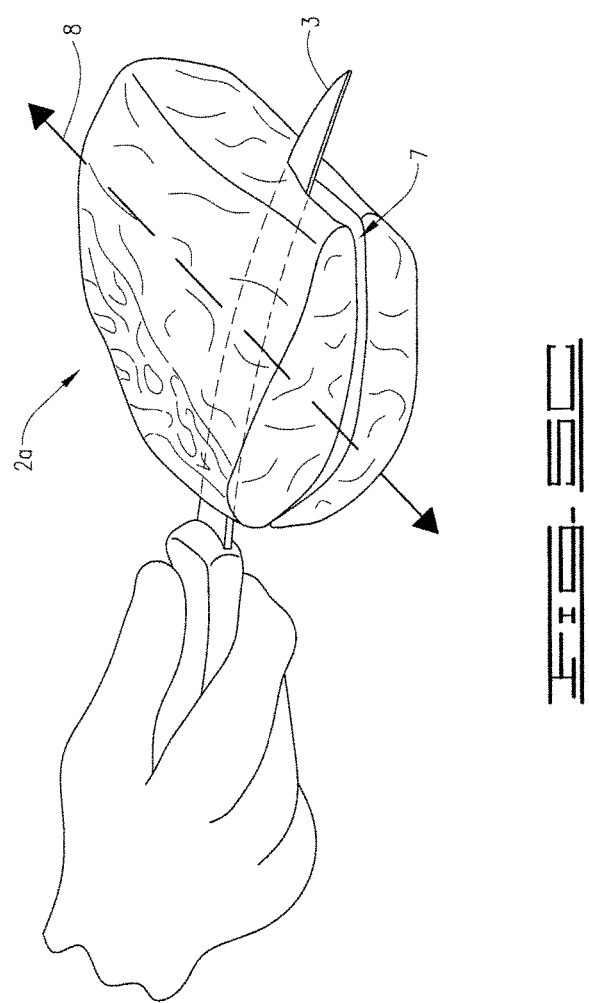

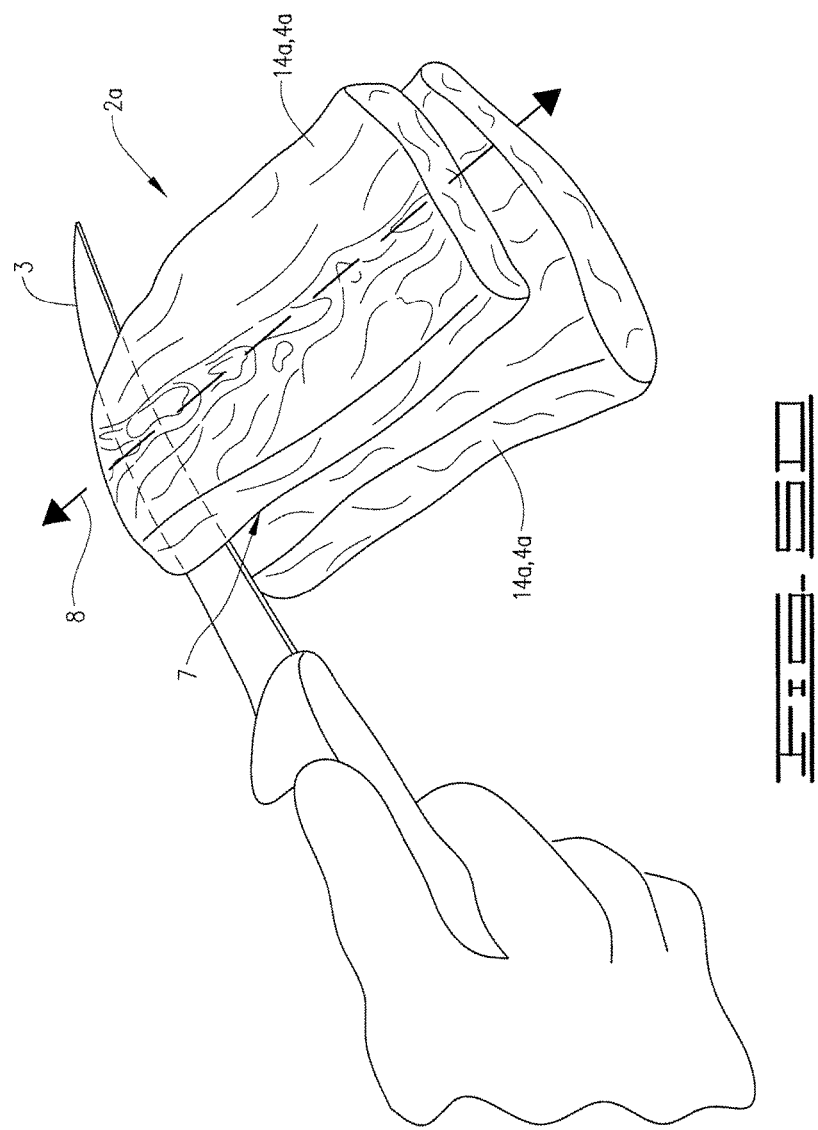

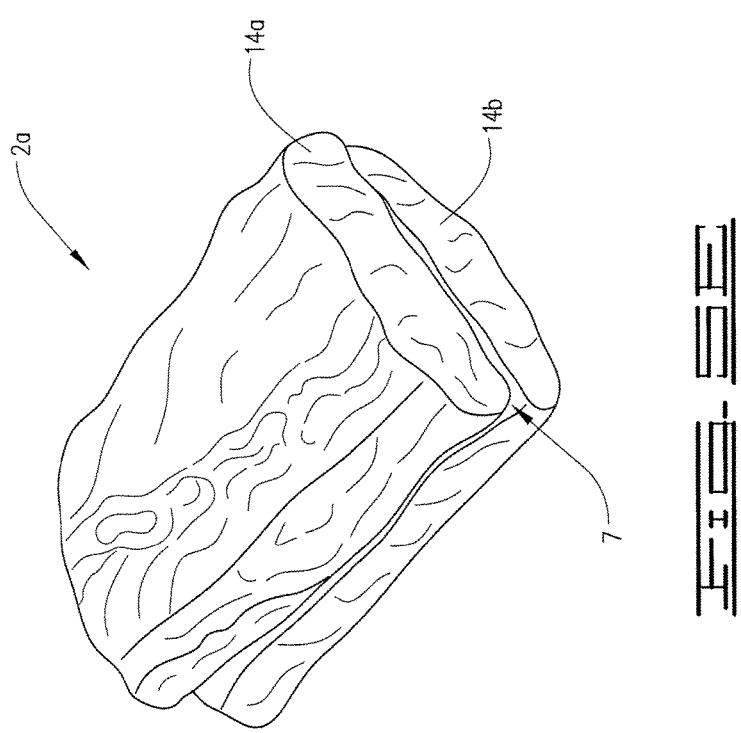

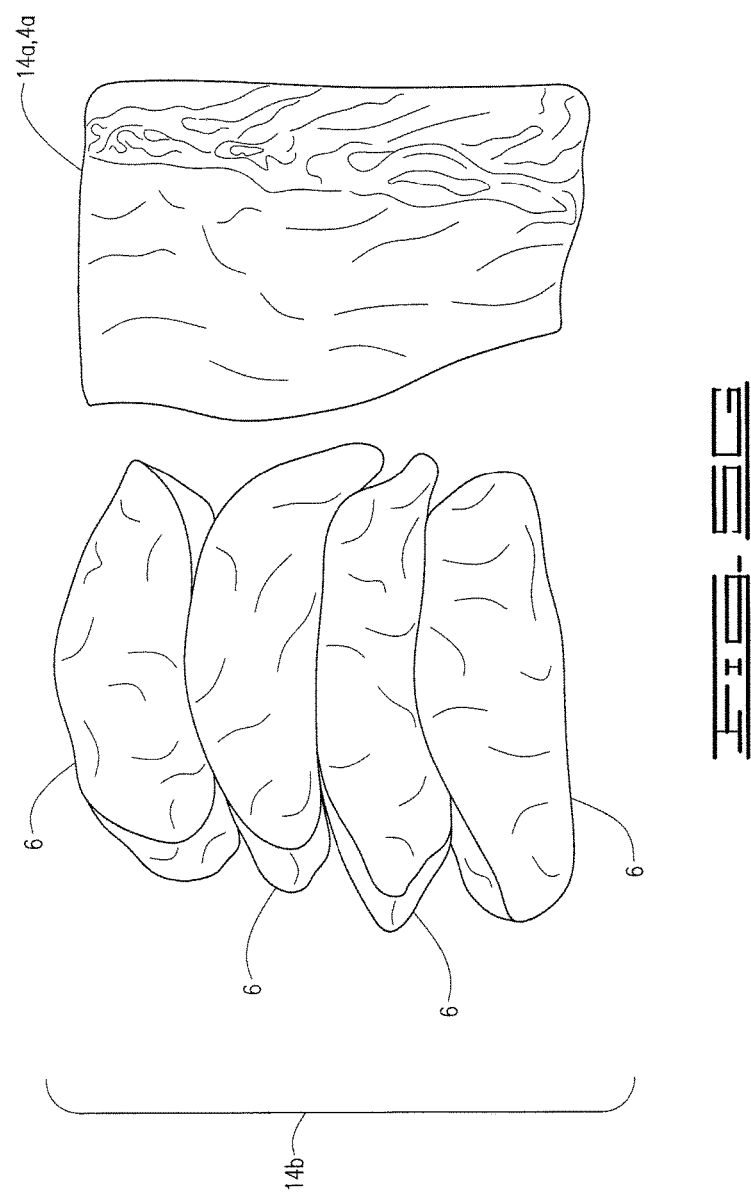

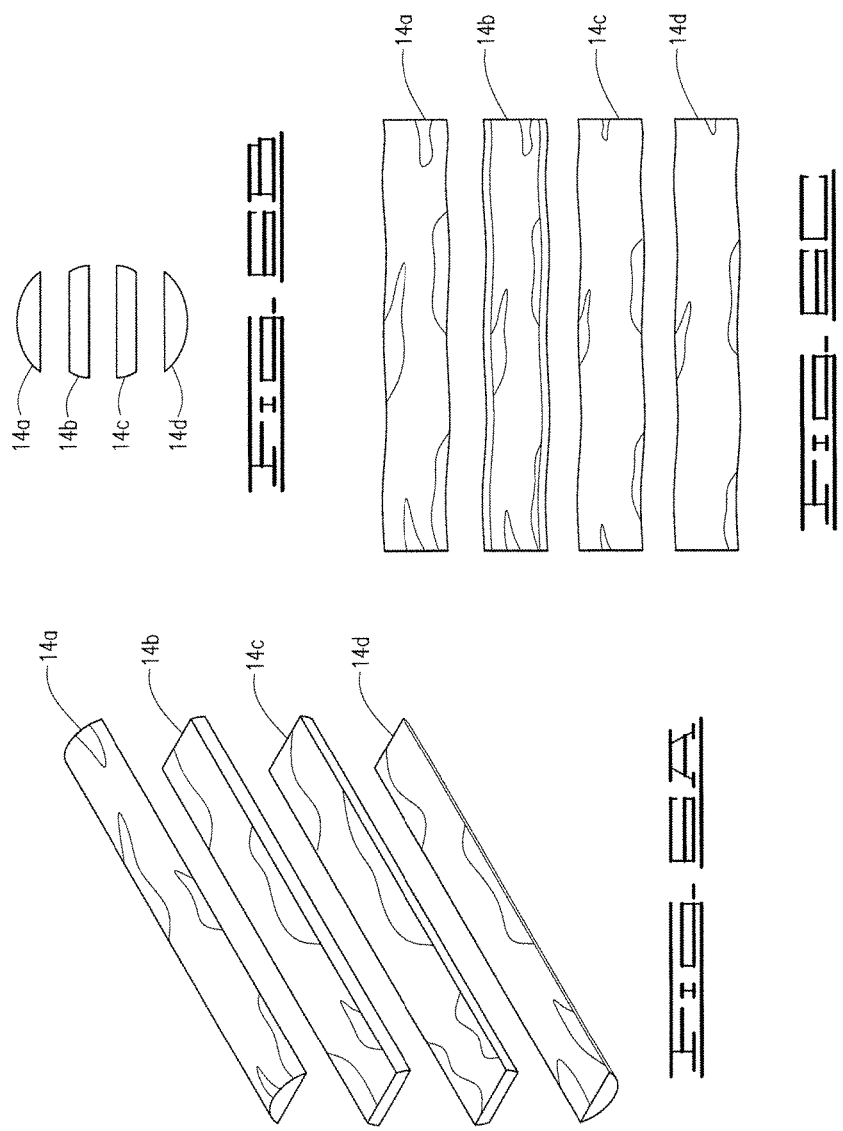

METHOD OF CUTTING A PORK LOIN AND A BONELESS PORK LOIN PRODUCT

RELATED APPLICATION

This application claims the benefit of U.S. Provisional Application No. 62/034,300 filed on Aug. 7, 2014, the entirety of which is incorporated herein by reference.

BACKGROUND

With increasing live weights of hogs, the industry is seeing heavier hog carcasses. In the past, the average live-weight was approximately 250 pounds; nowadays the weight of the hogs at the time of slaughter is about 285-300 pounds on average. Due to the increased size in hogs, there is an increase in the subprimal size and weight as well.

In today's market, retailers see higher priced "package rings" due, in part, by higher-priced protein and also to heavier subprimals. Heavier subprimals result in a larger loin meat product. Consumers are not interested in buying larger pork loin sizes nor are consumers interested in purchasing products that they do not recognize. These larger loin products take more time to cook, tend to not have substantial uniformity in thickness and/or width thereby resulting in inconsistent and uneven cooking preparation. New and innovative cutting procedures are needed to account for the increase in hog subprimal size and weight.

SUMMARY

A method of cutting a boneless elongated meat member, the elongated meat member being the loin of a hog carcass, the elongated meat member having a first end, a second end, and a longitudinal axis between the first and second ends. The method includes separating the boneless elongated meat member into at least three elongated meat portions, two exterior elongated meat portions, and an interior elongated meat portion where the interior elongated meat portion is substantially in the shape of a rectangular prism and is positioned between the two exterior elongated meat portions. The separating step includes cutting the elongated meat member end to end in substantially the same direction of the longitudinal axis the length of the elongated meat member. The resulting elongated meat portions are each about 0.0625 inches to about 4.0 inches thick.

The method also includes dividing the boneless elongated meat member, for example, the interior elongated meat portion, into a plurality of smaller meat pieces. The dividing step includes cutting the boneless elongated meat member substantially perpendicular with respect to the longitudinal axis.

BRIEF DESCRIPTION OF THE DRAWINGS

FIG. 2 is a block diagram of the method.

FIGS. 3A and 3B depict visual representations of various steps of the described method.

FIGS. 5A-5G depict visual representations of various steps of the described method.

FIGS. 6A-6C are visual examples of elongated meat portions resulting from one of the method steps.

DETAILED DESCRIPTION

The disclosed method provides an innovative way to cut boneless loin portions to account for the problems associated with the larger pork loin sizes in an efficient way that results in less waste of loin meat and less unusable meat portions. The resulting products from the method provide consumers with uniform meat products that can be sold, marinated, and seasoned relatively consistently.

Figure 1:
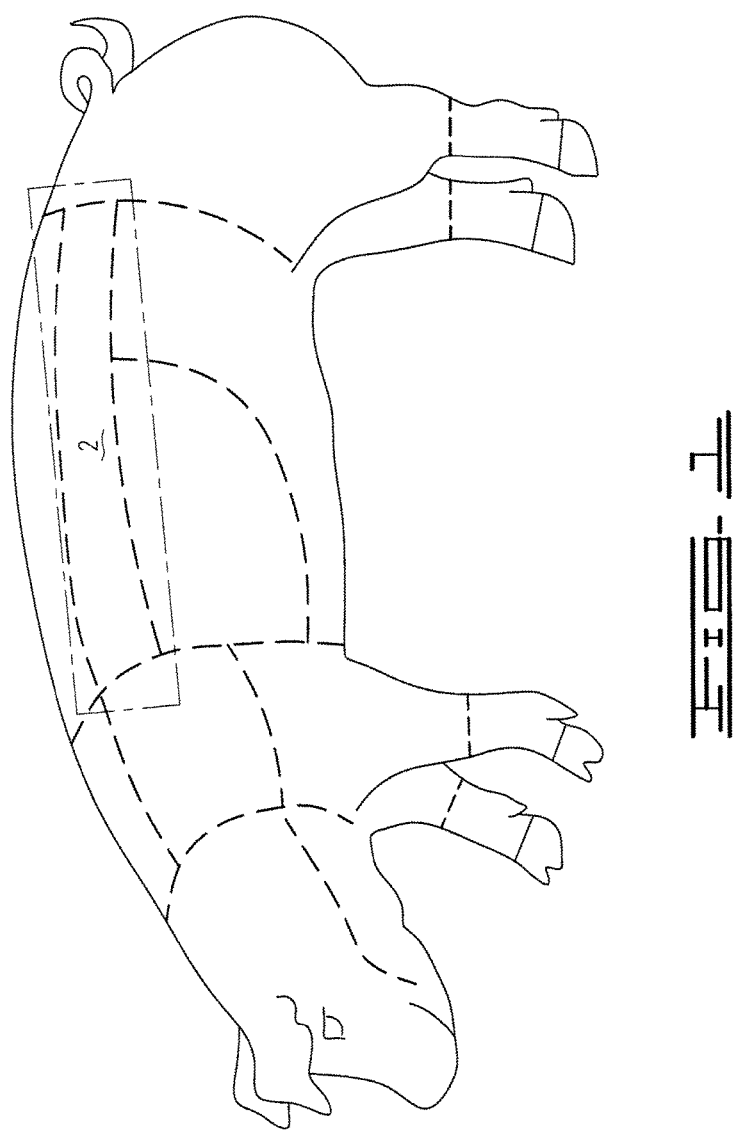
FIG. 1 illustrates the primal cuts of a hog.

FIG. 1 illustrates the primal cuts of a hog with loin 2 marked as shown. As shown in the figures, loin 2 is an elongated cut of meat. As used herein, loin 2 may also be referred to as an elongated meat member. Loin 2 includes a first end, a second end, and a longitudinal axis 8 between the first and second ends.

The disclosed method will first be described with reference to FIG. 2. References to other figures provide a visual example of the described step. It should be appreciated that FIGS. 3A-6C are visual examples of one or more ways to carry out the method described herein.

FIG. 2 depicts a block diagram of the method of cutting a pork loin. As will be described further herein the acts of separating and dividing loin 2 involve cutting or slicing. Cutting includes separating the portions of loin, removing the portions of boneless loin, severing the portions of boneless loin, or other similar descriptions. Cutting is achieved by any method used in the industry. Non-limiting examples of cutting apparatus 3 include: automated, manual, mechanized cutting apparatuses, and combinations thereof. For example, cutting apparatus 3 includes, but is not limited to, a knife or knives; rotary knives; band saws; shears; multi-blade cutting systems, and combinations thereof. One example of a multi-blade cutting apparatus 3 includes the Grasselli KSL CBU 400 horizontal multiple blade waterless slitter manufactured by Grasselli S.P.A. having a business address of Via Salvo D'Acquisto, 2/c 42020 Albinea (RE) Italy. For example, multi-blade cutting systems allow for the separating and dividing of loin 2 to occur simultaneously rather than each separation or division occurring in succession.

Loin 2 is removed from the loin of the hog carcass. At block 100, loin 2 is deboned where the chine bones, feather bones, backribs, riblets, button bones, and a large portion of the scapula and ilium bones are removed, resulting in a generally boneless pork loin, depicted as box 102. The generally boneless loin 2 has minimal bones within the loin, for example, a portion of the button bones, scapula, and a portion of the ilium bone may be present.

After the removal of the chine and feather bones, the resulting pork loin is positioned in a cutting area. Examples of a cutting area include a cutting surface; hanging devices; graspers, or other devices suitable for securing, supporting, and/or holding loin to achieve the desired cuts. For example, the cutting surface may be any surface known in the art suitable to achieve the desired cuts. By way of further example, the generally boneless pork loin may be positioned on a conveyor or moving surface, a stationary surface, combinations thereof, or in a cutting apparatus such as an industrial machine such as the Grasselli machine identified previously.

Step 106 represents separating the boneless loin 2 into at least two elongated meat portions. The separating step includes cutting loin 2 end to end in substantially the same direction of longitudinal axis 8 the length of loin 2. Reference numeral 7 represents the cut substantially in the same direction of longitudinal axis 8. The resulting elongated meat members 14, as depicted in FIGS. 3A-6C, are each about 0.0625 inches to about 4.0 inches thick, and all values therebetween. For example, FIGS. 5B-5E also illustrate separating step 106 with the resulting elongated meat members 14 having a similar thickness to each other.

Figure 3A:
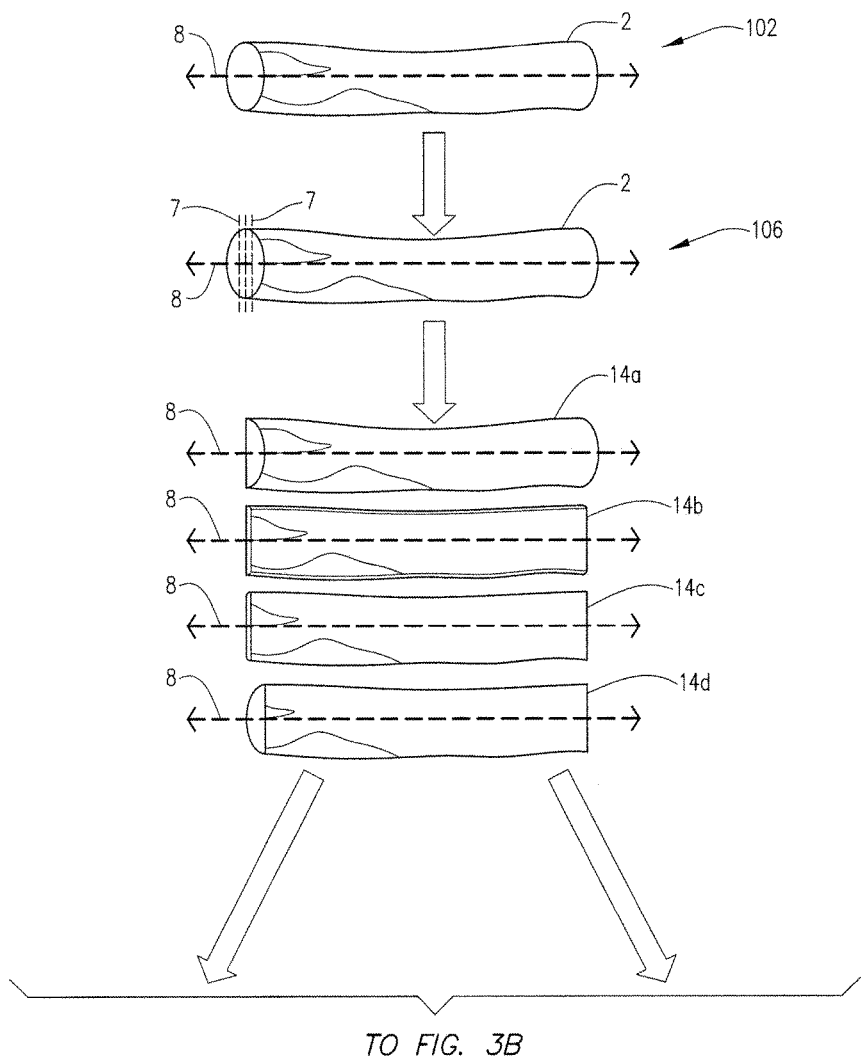

For example, with reference to FIG. 3A, step 106 is carried out over the entire length of loin 2 and results in two or more relatively flat elongated meat members 14 that each may be approximately 2-3 feet in length. As shown in FIGS. 3A and 6A, two exterior elongated meat portions 14a, 14d, and at least one interior elongated meat portion 14b, 14c is positioned between the two exterior elongated meat portions 14a, 14d. The interior elongate meat portion 14b, 14c is substantially in the shape of a rectangular prism and the exterior elongated meat portions 14a, 14d are substantially in the shape of a half-cylinder. FIGS. 6A, 6B, and 6C depict an isometric view, end view, and top view of the elongated meat portions 14 resulting from cut 7 of separating step 106.

Figure 4:
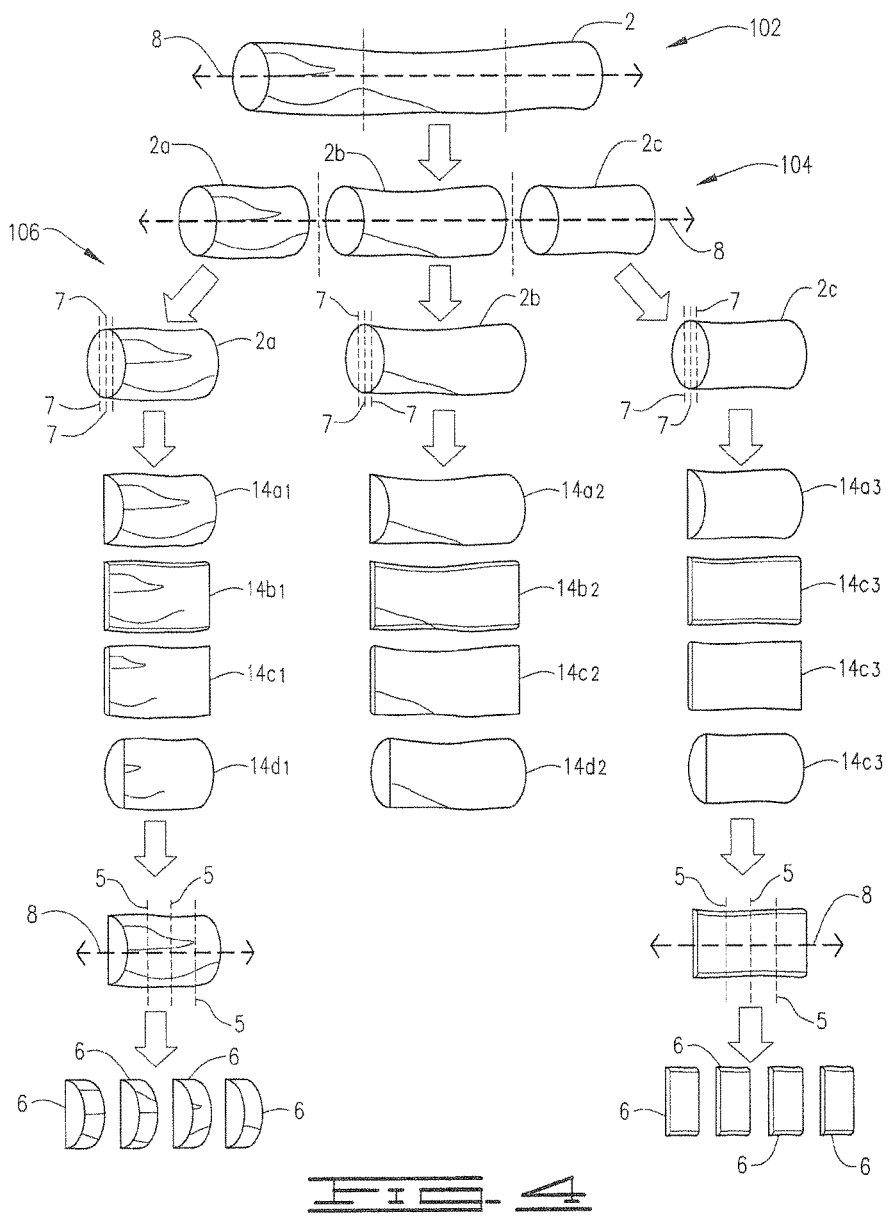
FIG. 4 depicts visual representations of various steps of the described method.

Step 104 is an optional separating or dividing step that can be performed either before or after step 106 as shown in FIGS. 3A and 3B. FIG. 4 is an exemplary visual depiction of the method when optional step 104 is performed prior to separating step 106.

Step 104 includes separating loin 2 into an anterior portion 2a, center cut portion 2b, and a posterior portion 2c. The separating of loin 2 into three portions is visually depicted in FIG. 4. Separating step 104a includes making at least two cuts substantially perpendicular to longitudinal axis 8 of loin 2. An example of a substantially perpendicular cut 5 is shown FIG. 5A.

Anterior portion 2a consists of a substantially intact spinalis dorsi muscle, a substantially intact mulitfidus muscle and a substantially intact longissimus dorsi muscle of the pork loin and the intermuscular seam that separates the spinalis dorsi muscle and the longisimus dorsi. Center cut portion 2b consists of longissimus dorsi, multifidus dorsi, and ilicostalis dorsi muscles of the pork loin. Posterior end portion 2c includes the gluteus complex, which consists essentially of a gluteus superficialis muscle, a gluteus medius muscle, a gluteus accessorius muscle, a gluteus profundus muscle, an obturator internmus muscle, and a tensor fasciae latae muscle of the pork loin. The tensor fasciae latae runs the entire length of the hog carcass.

The cut to separate anterior portion 2a from center cut portion 2b is made approximately from the second rib to the fifth rib or approximately at least four inches and up to about eight inches from the anterior edge of the boneless pork loin. As previously discussed, the loin is generally deboned; therefore, the use of the approximate location to separate the anterior portion with reference to the ribs are based on where the ribs would be located had the ribs not previously been removed from the generally boneless pork loin.

Optional step 104 continues to 104b with trimming to size the loin pieces, remove any silver skin, or any other undesirable components. Loin 2 may be trimmed of any fat beyond 0.125 inches thick. Step 104b includes denuding the most distal side (with respect to the location of the hog's head) of the each portion prior to continuing on with subsequent steps of the method.

If optional separating step 104 is performed, each resulting loin portion 2a, 2b, and 2c may undergo the same method steps as will be described further, or one or more of the resulting loin portions may undergo different processing steps as illustrated in FIG. 4.

It should be appreciated that the inventive method allows for versatility for processing various portions of loin 2. For example, if optional step is performed, each loin portion, 2a, 2b, and 2c may undergo the same or different processing known in the art. For example, at least one of anterior portion 2a, center cut portion 2b, and posterior end portion 2c will undergo processing disclosed by the present method and the other loin portions may undergo other processing known in the art.

Figure 5F:
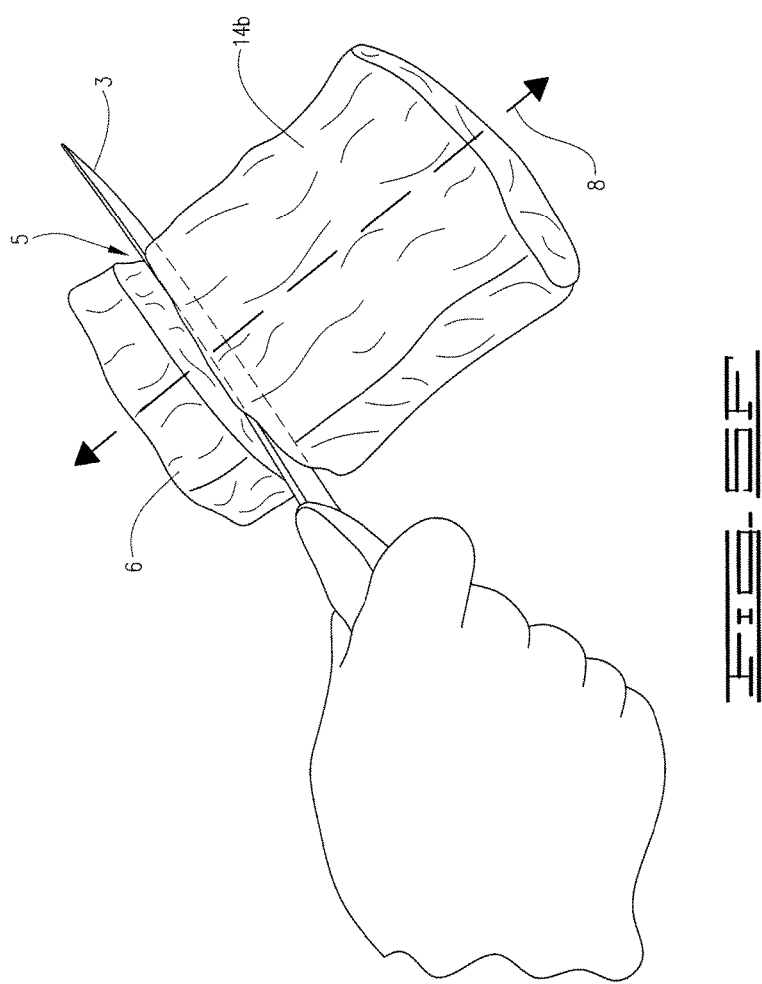

The method also includes step 110, dividing loin 2 by cutting substantially perpendicular to longitudinal axis 8. Reference numeral 5 represents the cut substantially perpendicular to longitudinal axis 8. For example, FIG. 5F depicts one of the elongated meat members 14b being divided into a plurality of smaller pieces 6 by cut 5. Unlike traditional cuts which follow the grain of the muscle, the substantially perpendicular cut 5 is opposite the direction of the muscle grain. Cut 5 does not adversely affect the tenderness of the meat, the aesthetic appearance, or the integrity of the meat.

The versatility of the described method is shown in FIG. 5G as multiple and different meat products are attainable. As shown in FIGS. 5F and 5G, elongated meat member 14b is divided one or more times with cut 5 that is substantially perpendicular to longitudinal axis 8, and in this case, the length of elongate meat member 14b. The resulting smaller meat pieces include loin chops or loin roasts 6 and a substantially flat loin steak 4. The method may continue at step 112, which including further processing of each of the smaller meat pieces, such as for example, further trimming, sizing, and/or flavoring of the meat pieces. Sizing refers to the molding, forming, and combinations thereof to obtain a desired weight or shape of the meat product.

After step 106, the method may also continue straight to step 114, elongated meat member 14, for example, an interior elongated meat member 14 may undergo further processing, further trimming, sizing, and/or flavoring of the meat pieces. For example elongated meat member 14 can be sized into a plurality of net-weight pieces to be to be marinated or seasoned, and the thickness of each loin steak remains relatively constant.

FIGS. 3A, 3B, and 4 illustrate the versatility of the described method. For example, with reference to FIGS. 3A and 3B, boneless pork loin 2 is separated into at least three elongated meat portions 14. As shown in FIG. 3A separating step 106 includes cutting boneless pork loin 2 end to end in substantially the same direction of longitudinal axis 8 of the boneless pork loin the length of the boneless pork loin 2. In the depicted example, separating step 106 occurred as a result of 3 cuts performed simultaneously and yielded four elongated meat portions, two exterior elongated meat portions 14a and 14d, and two interior elongated meat portions 14b and 14c. Interior elongated meat portions 14b and 14c are each substantially in the shape of a rectangular prism as shown in FIG. 6A-6C, and are positioned between the two exterior elongated meat portions 14a and 14d. It should be appreciated that the cuts may be performed in succession to one another as well. Each of the resulting elongated meat portions 14 are of a similar thickness to each other, for example, resulting elongated meat portions 14 are each about 0.0625 inches to about 4.0 inches thick.

The method further includes dividing one of interior elongated meat portions 14b into a plurality of smaller pieces as shown in FIG. 3B. The dividing step 110 includes cutting the interior elongated meat portion substantially perpendicular with respect to the longitudinal axis and the resulting plurality of smaller pieces 4 which are each substantially in the shape of a rectangular prism. An additional dividing step 110 may be carried out on one or more of the plurality of smaller pieces 4 to yield even smaller meat products 6 as shown in FIG. 3B.

The method may also include dividing at least one of the exterior elongated meat portion 14a into a plurality of smaller meat pieces as shown in FIG. 3B as previously described with respect to interior elongated meat portion 14b. For example, when the dividing step 110 is carried out to yield meat products 6, such products each have a net-weight in the range of about two ounces to about ten ounces.

FIG. 4 visually depicts the disclosed method with optional step 104 occurring before step 106. As shown in FIG. 4, one or more of an elongated meat portion 14 can undergo different processing. For example, as shown in FIG. 4, exterior elongated meat portion 14a1 undergoes dividing step 110 the entire length of exterior elongated meat portion 14a1 to yield a plurality of smaller meat pieces, in this example, pork chops or loin roast 6. The other elongated meat portions 14b1, 14c1, and 14d1 of anterior end portion 2a may undergo the same or different steps of the described method. FIG. 4 also depicts interior elongated meat portion 14b3 of posterior end portion 2c including dividing step 110. Depending on the end-application of the meat products, the resulting product may be a pork chop or loin roast 6.

As a result of the described method, each resulting meat product, e.g. loin chop or loin roast 6 or loin steaks 4 can be sized until a desired net-weight is achieved. Each resulting meat product 4, 6 is substantially uniform in thickness and width to its like-companion pieces. As a result, uniformity in size, appearance, and cooking time can be achieved for these pork products.

As previously mentioned, not all portions of loin 2 must undergo the disclosed method. For example, loin 2 need not be cut into all loin chops 6 or loin steaks 4, but that it may include combinations thereof. For example, exterior elongated meat portion 14a may be cut and sized to be sold as boneless pork loin while interior elongated meat member 14b undergoes the method disclosed and the resulting smaller meat parts are loin steaks 4, and the other exterior elongated meat portion 14c may be divided into pork chops 6 using the described method.

As used herein, consisting essentially of a specific muscle or group of muscles refers to the muscle plus the seams associated with muscle(s) and possibly also minor proportions, approximately less than or equal to 5% of other muscles and hog carcass materials. Hog carcass materials include, all materials, fluids, and bone fragments of the hog carcass.

As used herein, associated seams includes membranes, and/or connective tissue including intermuscular seams.

As used herein, the term "substantially intact" refers to muscle within a particular portion of interest. The substantially intact muscle has approximately 50% or above of the initial muscle material present in that portion of the loin intact. The term "substantially intact" muscle is not based on a percentage of the total muscle material for the particular muscle present in the entire hog carcass.

As used herein, the term "substantially" means that the subsequently described event or circumstance completely occurs or that the subsequently described event or circumstance occurs to a great extent or degree or that the subsequently described event or circumstance occurs to the extent or degree indicated. For example, the phrases "substantially in the same direction as" or "substantially perpendicular to" mean that the subsequently described event or circumstance occurs is at least 85% in the same direction or perpendicular to, or at least 90% in the same direction or perpendicular to, or at least 95% in the same direction or perpendicular to, or at least 98% in the same direction or perpendicular to. Also, the term "substantially" will be understood to allow for minor variations and/or deviations that do not result in a significant impact thereto.

As used herein, undesirable components include any material or component that may affect the uniform and appetizing appearance of the meat product to consumers that may adversely affect a pleasant culinary experience by the consumer. Examples of undesirable components include material such as fat, blood clots, bruises, bone chips, cartilage, intermuscular seams, and/or extraneous material present on the meat due to the cutting process, such as, but not limited to, bone fragments that fall on the meat during deboning.

The present disclosure is not limited to the above examples and descriptions. Other embodiments will be apparent to one skilled in the art. As such, the foregoing description merely enables and describes the general uses and methods disclosed herein. While certain embodiments have been described for the purpose of this disclosure, those skilled in the art can make changes without departing from the spirit and scope thereof. The scope is to be determined by reference to the appended claims.

What is claimed is:

1. A method of cutting a boneless elongated meat member, the elongated meat member being the loin of a hog carcass in substantially the shape of a cylinder, the elongated meat member having a first end, a second end, and a longitudinal axis between the first and second ends, the method comprising:

separating the boneless elongated meat member into at least three elongated meat portions and each of the at least three elongated meat portions have a first end, a second end, and a longitudinal axis between the first and second ends, wherein two of the at least three elongated meat portions are exterior elongated meat portions and each exterior elongated meat portion is substantially in the shape of a half-cylinder, and at least one of the at least three elongated meat portions is an interior elongated meat portion positioned between the two exterior elongated meat portions and the interior elongated meat portion is substantially in the shape of a rectangular prism that includes a top surface, a bottom surface opposite the top surface, and four exterior side surfaces between the top and bottom surfaces, wherein two of the four exterior side surfaces are elongated side surfaces each running the length of the interior elongated meat portion and wherein each of the elongated side surfaces are opposite each other, and two of the four exterior side surfaces are short side surfaces positioned between the elongated side surfaces and wherein one short side surface is at the first end and the other is at the second end of the interior elongated meat portion, and wherein the short side surfaces substantially define a width of the interior elongated meat portion and wherein a thickness of the interior elongated meat portion is substantially defined between the top and bottom surfaces, wherein the separating step includes cutting the elongated meat member end to end in substantially the same direction of the longitudinal axis the length of the elongated meat member, wherein the at least three elongated meat portions are each about 0.0625 inches to about 4.0 inches thick; and dividing the at least one interior elongated meat portion into a plurality of smaller meat pieces, wherein the dividing step includes cutting the at least one interior elongated meat portion substantially perpendicular with respect to the longitudinal axis of the interior elongated meat portion and between the top and bottom surfaces in the same direction as its thickness.

2. The method of claim 1 further comprising the step of:
trimming the at least one of the plurality of smaller meat pieces.

3. The method of claim 1 further comprising the step of:
seasoning the at least one of the plurality of smaller meat pieces.

4. The method of claim 1, wherein the separating and dividing steps each include at least two cuts.

5. The method of claim 4, wherein the at least two cuts of the separating step are performed simultaneously with each other, and wherein the at least two cuts of the dividing step are performed simultaneously with each other.

6. The method of claim 1 further comprising the step of:
before the separating step and dividing step, dividing the elongated meat member into at least three substantially cylindrical pieces, wherein the at least three substantially cylindrical pieces include an anterior substantially cylindrical piece, a center substantially cylindrical piece, and a posterior substantially cylindrical piece.

7. The method of claim 1, wherein the resulting plurality of smaller meat pieces from the dividing step are each approximately the same net-weight within five (5) percent of each other.

8. The method of claim 2, wherein the steps of separating the boneless elongated meat member, dividing the at least one interior elongated meat portion, and trimming are each performed using a cutting apparatus.

9. The method of claim 8, wherein the cutting apparatus is selected from one or more of a manual cutting apparatus, a mechanized cutting apparatus, or combination thereof.

10. A method of cutting a boneless pork loin into a plurality of pieces forming various meat products, the boneless pork loin having a first end, a second end, and a longitudinal axis between the first and second ends and the boneless pork loin is substantially cylindrical in shape, the method comprising:
separating the boneless pork loin into at least three elongated meat portions, wherein two of the at least three elongated meat portions are exterior elongated meat portions and at least one of the at least three elongated meat portion is an interior elongated meat portion between the two exterior elongated meat portions, wherein the separating step includes cutting the boneless pork loin end to end in substantially the same direction of the longitudinal axis the length of the boneless pork loin, wherein each of the at least three elongated meat portions are each about 0.0625 inches to about 4.0 inches thick, wherein the interior elongated meat portion is substantially a rectangular prism in shape and includes a first end, a second end opposite the first end, and a longitudinal axis between the first and second ends, a top surface, a bottom surface opposite the top surface and the thickness defined between the top and bottom surfaces, wherein the interior elongated meat portion also includes four exterior side surfaces between the top and bottom surfaces, wherein two of the four exterior side surfaces are elongated side surfaces positioned opposite each other and define the length of the interior elongated meat portion, and wherein two of exterior side surfaces are short side surfaces positioned between the elongated side surfaces and wherein a first short side surface is at the first end and a second side surface is at the second end, and wherein the short side surfaces substantially define a width of the interior elongated meat portion as measured between the elongated side surfaces;

after the separating step, dividing the at least one or more interior elongated meat portion into a plurality of smaller meat parts, wherein the dividing step includes cutting the one or more of the at least one or more interior elongated meat portion substantially perpendicular with respect to the longitudinal axis of the interior elongated meat portion and between the top and bottom surfaces in the same direction as its thickness; and trimming at least one of the plurality of smaller meat parts, such that each smaller meat part is approximately the same net-weight within five (5) percent of each other.

11. The method of claim 10, further comprising the step of:
seasoning the at least one of the plurality of smaller meat pieces.

12. The method of claim 10, wherein the separating and dividing steps each include at least two cuts.

13. The method of claim 10, wherein the steps of separating the boneless pork loin, dividing the at least one interior elongated meat portion, and trimming are each performed using a cutting apparatus selected from one or more of a manual cutting apparatus, a mechanized cutting apparatus, and combinations thereof.

14. A method of cutting a boneless pork loin that is substantially cylindrical in shape into a plurality of pieces forming various meat products, the method comprising:
separating the boneless pork loin into at least three elongated meat portions, two exterior elongated meat portions, and an interior elongated meat portion, the interior elongated meat portion is substantially in the shape of a rectangular prism and is positioned between the two exterior elongated meat portions, wherein the interior elongated meat portion includes a first end, a second end opposite the first end, and a longitudinal axis between the first and second ends, a top surface, a bottom surface opposite the top surface and a thickness of the interior elongated meat portion is defined between the top and bottom surfaces, wherein the interior elongated meat portion also includes four exterior side surfaces between the top and bottom surfaces, wherein two of the four exterior side surfaces are elongated side surfaces positioned opposite each other and define the length of the interior elongated meat portion, and wherein two of exterior side surfaces are short side surfaces positioned between the elongated side surfaces and wherein a first short side surface is at the first end and a second side surface is at the second end, and wherein the short side surfaces substantially define a width of the interior elongated meat portion as measured between the elongated side surfaces, wherein the separating step includes cutting the boneless pork loin end to end in substantially the same direction of a longitudinal axis of the boneless pork loin the length of the boneless pork loin, wherein the at least three elongated meat portions are each about 0.0625 inches to about 4.0 inches thick; and after the separating step, dividing the interior elongated meat portion into a plurality of smaller pieces, wherein the dividing the interior elongated meat portion step includes cutting the interior elongated meat portion substantially perpendicular with respect to the longitudinal axis of the interior elongated meat portion and between the top and bottom surfaces in the same direction as its thickness and the resulting plurality of smaller pieces are each substantially in the shape of a rectangular prism.

15. The method of claim 14, further comprising the step of dividing at least one of the exterior elongated meat portion into a plurality of smaller meat pieces, wherein the exterior elongated meat portion is substantially in the shape of a half-cylinder having a substantially planar surface and an arcuate surface and includes a first end, a second end opposite the first end, and a longitudinal axis between the first and second ends, wherein the thickness of the exterior elongated meat portion is defined at a widest point as measured between the substantially planar surface and the arcuate surface of the elongated meat portion, wherein the dividing the at least one of the exterior elongated meat portion step includes cutting the at least one of the exterior elongated meat portion substantially perpendicular with respect to the longitudinal axis of the at least one of the exterior elongated meat portion and between the arcuate surface and the substantially planar surface in the same direction as its thickness, wherein the plurality of smaller meat pieces each have a net-weight in the range of about two ounces to about ten ounces.

16. The method of claim 14, further comprising the step of:
   trimming at least one of the plurality of smaller meat pieces.

17. The method of claim 14, further comprising the step of:
   seasoning the at least one of the plurality of smaller meat pieces.

18. The method of claim 14, wherein the separating and dividing steps each include at least two cuts.

19. The method of claim 16, wherein the steps of separating the boneless pork loin, dividing the at least one or more interior elongated meat portion, and trimming are each performed using a cutting apparatus selected from one or more of a manual cutting apparatus, a mechanized cutting apparatus, and combinations thereof.

* * * * *